United States Patent
Oba

(10) Patent No.: US 9,363,205 B2
(45) Date of Patent: Jun. 7, 2016

(54) COMMUNICATION APPARATUS AND COMMUNICATION CONTROL PROGRAM

(71) Applicant: KABUSHIKI KAISHA TOSHIBA, Minato-ku (JP)

(72) Inventor: Yoshihiro Oba, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 168 days.

(21) Appl. No.: 14/198,778

(22) Filed: Mar. 6, 2014

(65) Prior Publication Data

US 2014/0269771 A1    Sep. 18, 2014

(30) Foreign Application Priority Data

Mar. 12, 2013  (JP) .................................. 2013-049477

(51) Int. Cl.
*H04L 12/931*  (2013.01)
(52) U.S. Cl.
CPC ...................................... *H04L 49/20* (2013.01)
(58) Field of Classification Search
None
See application file for complete search history.

(56) References Cited

U.S. PATENT DOCUMENTS

| 6,839,327 | B1* | 1/2005 | Zavalkovsky | H04L 41/0893 370/230 |
| 2002/0136217 | A1* | 9/2002 | Christensen | H04L 29/06027 370/393 |
| 2005/0285755 | A1* | 12/2005 | Moon | H04L 47/10 340/855.4 |
| 2009/0003383 | A1* | 1/2009 | Watanabe | H04W 28/06 370/474 |
| 2013/0013731 | A1* | 1/2013 | Ree | H04L 67/125 709/217 |

FOREIGN PATENT DOCUMENTS

JP    2012-209905    10/2012

OTHER PUBLICATIONS

Daji Qiao, et al., "Goodput Enhancement of IEEE 802.11a Wireless LAN via Link Adaptation", IEEE ICC, vol. 7, 2001, pp. 1995-2000.
Byung-Seo Kim, et al., "Throughput Enhancement Through Dynamic Fragmentation in Wireless LANs", IEEE Transactions on Vehicular Technology, vol. 54, No. 4, Jul. 2005, pp. 1415-1425.

* cited by examiner

*Primary Examiner* — Diane Lo
(74) *Attorney, Agent, or Firm* — Oblon, McClelland, Maier & Neustadt, L.L.P.

(57) ABSTRACT

A communication apparatus has an upper-layer evaluation parameter acquisition part configured to acquire an evaluation parameter for an upper-side layer among a plurality of layers included in a network, a fragment-size decision part configured to decide a fragment size to be used in dividing a packet that includes information of an upper-side layer into fragments, based on the evaluation parameter acquired by the upper-layer evaluation parameter acquisition part, and a fragment controller configured to divide the packet into a plurality of fragments based on the fragment size.

16 Claims, 14 Drawing Sheets

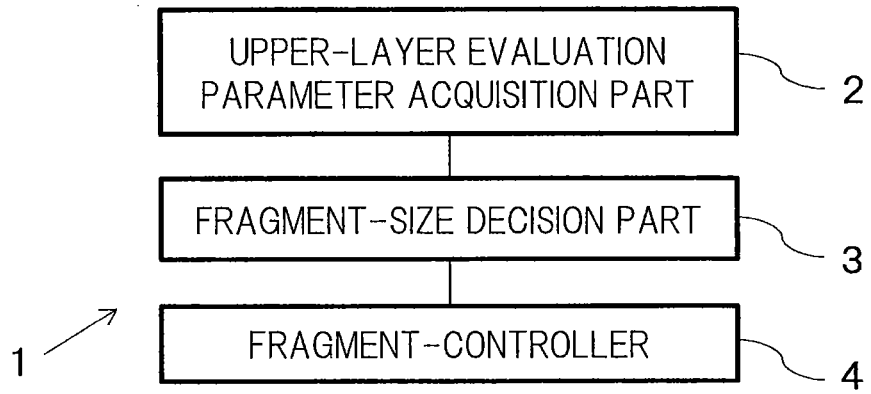
FIG.1
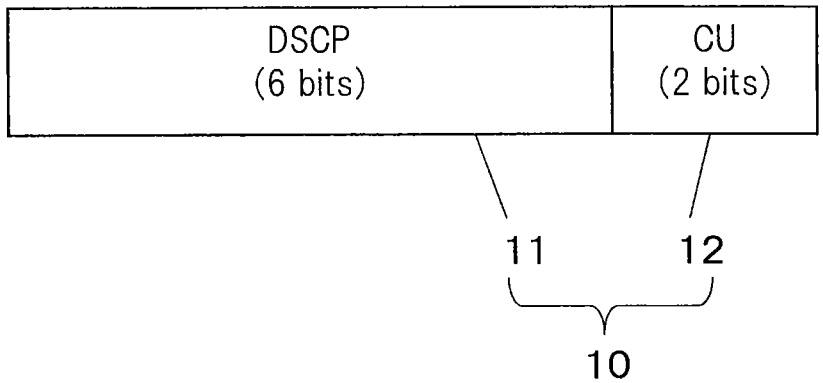
FIG.2
FIG.3

| UPPER LAYER TYPE | | | | | UPPER-LAYER COMMUNICATION PROFILE | LOWER-LAYER EVALUATION PARAMETER THRESHOLD VALUE | |
|---|---|---|---|---|---|---|---|
| UPPER-LAYER PROTOCOL NAME | FLOW CLASSIFICATION INFORMATION(F) | | | | REAL-TIME REQUIREMENT (RT) | BER_max | CBR_max |
| | ORIGINAL-SENDER IP ADDRESS | DESTINATION IP ADDRESS | PROTOCOL | ORIGINAL-SENDER PORT NUMBER/ ICMP Type | DESTINATION PORT NUMBER/ ICMP Code | | | |
| * | * | * | TCP | * | * | 0 | 0.00004 | 0.7 |
| ICMP Echo Request | * | * | ICMP | 8 | * | 1 | * | * |
| ICMP Echo Reply | * | * | ICMP | 0 | * | 1 | * | * |
| PANA | * | * | UDP | * | 765 | 0 | 0.00003 | 0.6 |
| RTP | S | D/128 | UDP | 765 | * | 1 | * | * |
| RTCP | S | D/128 | UDP | * | P | 1 | * | * |
| * | * | * | IPsec ESP | * | P+1 | -1 | * | * |
| * | * | * | IPsec AH | * | * | -1 | * | * |
| DNS | * | * | UDP | * | 53 | 1 | * | * |
| | | | | 53 | * | | | |

| UPPER LAYER TYPE | | | | | | UPPER-LAYER COMMUNI-CATION PROFILE | LOWER-LAYER EVALUATION PARAMETER THRESHOLD VALUE |
|---|---|---|---|---|---|---|---|
| | FLOW CLASSIFICATION INFORMATION(F) | | | | | | |
| UPPER-LAYER PROTOCOL NAME | ORIGINAL-SENDER IP ADDRESS | DESTINATION IP ADDRESS | PROTOCOL | ORIGINAL-SENDER PORT NUMBER/ ICMP Type | DESTINATION PORT NUMBER/ ICMP Code | REAL-TIME REQUIREMENT (RT) | ORIGINAL-SENDER IP ADDRESS |
| * | * | * | TCP | * | * | 0 | 2.6 |
| ICMP Echo Request | * | * | ICMP | 8 | * | 1 | * |
| ICMP Echo Reply | * | * | ICMP | 0 | * | 1 | * |
| PANA | * | * | UDP | * | 765 | 0 | 2.0 |
| | | | | 765 | * | | |
| RTP | S | D/128 | UDP | * | P | 1 | * |
| RTCP | S | D/128 | UDP | * | P+1 | 1 | * |
| * | * | * | IPsec ESP | * | * | -1 | * |
| * | * | * | IPsec AH | * | * | -1 | * |
| DNS | * | * | UDP | * | 53 | 1 | * |
| | | | | 53 | * | | |

22

| UPPER-LAYER PROTOCOL NAME | UPPER LAYER TYPE ||||||  UPPER-LAYER COMMUNI-CATION PROFILE | LOWER-LAYER EVALUATION PARAMETER THRESHOLD VALUE |
| --- | --- | --- | --- | --- | --- | --- | --- |
| | FLOW CLASSIFICATION INFORMATION(F) ||||| REAL-TIME REQUIREMENT (isRT) | |
| | ORIGINAL-SENDER IP ADDRESS | DESTINATION IP ADDRESS | PROTOCOL | ORIGINAL-SENDER PORT NUMBER/ICMP Type | DESTINATION PORT NUMBER/ICMP Code | | |
| * | * | * | TCP | * | * | 0 | ETX_path_max |
| ICMP Echo Request | * | * | ICMP | 8 | * | 1 | H x ETX_max |
| ICMP Echo Reply | * | * | ICMP | 0 | * | 1 | * |
| PANA | * | * | UDP | * | 765 | 0 | H x ETX_max |
| | | | | 765 | * | | |
| RTP | S | D/128 | UDP | * | P | 1 | * |
| RTCP | S | D/128 | UDP | * | P+1 | 1 | * |
| * | * | * | IPsec ESP | * | * | -1 | * |
| * | * | * | IPsec AH | * | * | -1 | * |
| DNS | * | * | UDP | * | 53 | 1 | * |
| | | | | 53 | * | | |

FIG.10

COMMUNICATION APPARATUS AND COMMUNICATION CONTROL PROGRAM

CROSS REFERENCE TO RELATED APPLICATIONS

This application is based upon and claims the benefit of priority from the prior Japanese Patent Application No. 2013-049477, filed on Mar. 12, 2013, the entire contents of which are incorporated herein by reference.

FIELD

Embodiments of the present invention relate to a communication apparatus and a communication control program for dividing a packet into a plurality of fragments.

BACKGROUND

In packet communication, a data size transmissible at a time is decided beforehand. Therefore, when a packet of a larger size than the transmissible size is transmitted, the packet has to be divided into a plurality of fragments.

A variety of ways of fragment size decision have been proposed. However, a fragment size in consideration of upper layer characteristics has not been studied.

BRIEF DESCRIPTION OF THE DRAWINGS

FIG. 1 is a functional block diagram of a communication apparatus 1 according to a first embodiment;

FIG. 2 is a view showing an example of a table 9 that is looked up when a fragment-size decision part 3 in the first embodiment decides a fragment size;

FIG. 3 is a view showing a format of a DSCP field 11 defined by RFC2474;

FIG. 6 is a view of a table that shows the correspondence among an upper layer type, an upper-layer communication profile and a threshold value of a lower-layer evaluation parameter;

FIG. 8 is a view showing an example of a table 22 that is looked up when a fragment-size decision part 3 in a third embodiment decides a fragment size;

FIG. 10 is a view showing an example of a table 23 that is looked up when a fragment-size decision part 3 in a fourth embodiment decides a fragment size;

DETAILED DESCRIPTION

Figure 4:
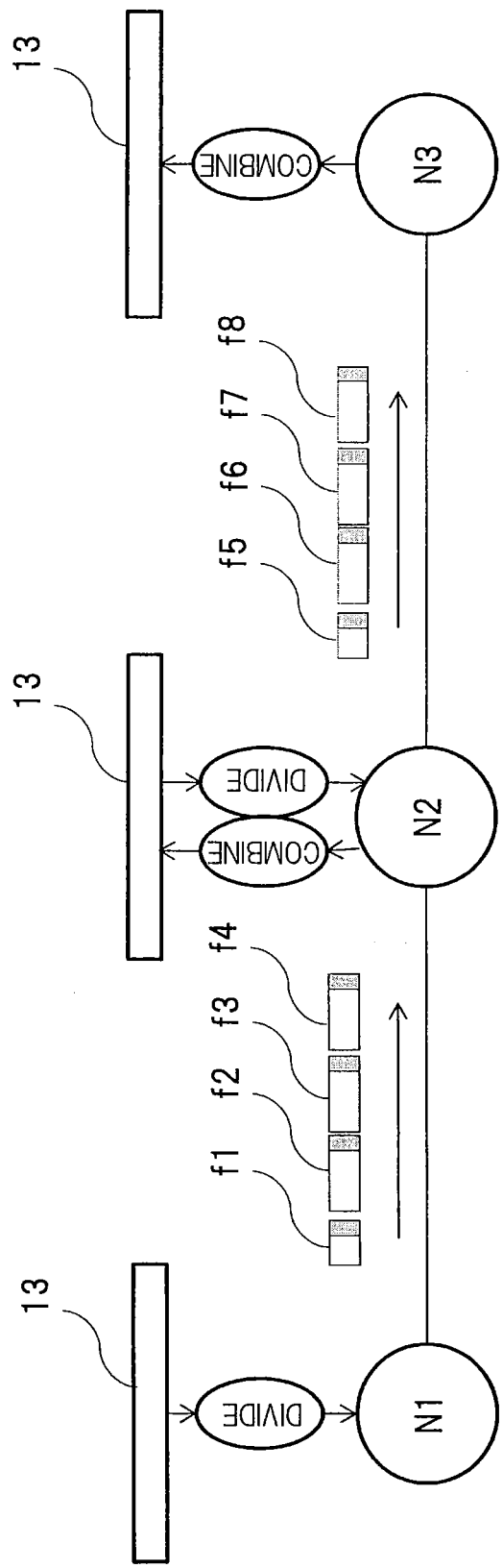
FIG. 4 is a view showing an example of a wireless multi-hop network system using a plurality of communication apparatuses 1 each shown FIG. 1.

A communication apparatus according to one embodiment has an upper-layer evaluation parameter acquisition part configured to acquire an evaluation parameter for an upper-side layer among a plurality of layers included in a network, a fragment-size decision part configured to decide a fragment size to be used in dividing a packet that includes information of an upper-side layer into fragments, based on the evaluation parameter acquired by the upper-layer evaluation parameter acquisition part, and a fragment controller configured to divide the packet into a plurality of fragments based on the fragment size.

Embodiments will now be explained with reference to the accompanying drawings.

First Embodiment

A first embodiment will explain an example in which fragmentation is performed by 6LoWPAN (IPv6 over Low-Power Wireless Personal Area Network) that is a communication protocol for passing IPv6 packets through an IEEE802.15.4 network defined by IETF (internet Engineering Task Force).

FIG. 1 is a functional block diagram of a communication apparatus 1 according to the first embodiment. In more practically, FIG. 1 is a functional block diagram for the communication apparatus 1 to perform 6LoWPAN fragmentation of IP packets to be transmitted. Before 6LoWPAN fragmentation, IP fragmentation may be performed.

The communication apparatus 1 of FIG. 1 is provided with an upper-layer evaluation parameter acquisition part 2, a fragment-size decision part 3, and a fragment controller 4.

The upper-layer evaluation parameter acquisition part 2 acquires an evaluation parameter (hereinafter, an upper-layer evaluation parameter) for upper-side layers among a plurality of layers of a network.

The fragment-size decision part 3 decides a fragment size to be used in dividing a packet that includes information of an upper-side layer into fragments, based on an upper-layer evaluation parameter. The fragment size to be decided requires to be smaller than the maximum frame size of a data link layer.

The fragment controller 4 divides a packet into a plurality of fragments based on a fragment size.

An upper-layer evaluation parameter to be acquired by the upper-layer evaluation parameter acquisition part 2 is, for example, a value written in a DSCP (Differentiated Services Code Point) field of each IP packet. The DSCP field may be set to a value related to communication quality of an upper layer by a communication apparatus 1 of an IP-packet original sender. This value is, for example, a value for identifying a content type of a packet to be transmitted. Or the value of the DSCP field may be set or updated by a communication apparatus 1 existed on the way to relay a packet transmitted by an original sender's communication apparatus 1. The communication apparatus 1 for setting or updating the value of the DSCP field may be the same as or different from the communication apparatus 1 shown in FIG. 1.

FIG. 2 is a view showing an example of a table 9 that is looked up when the fragment-size decision part 3 in the first embodiment decides a fragment size. This table 9 is installed, for example, in the communication apparatus 1 of FIG. 1. In the table 9 of FIG. 2, the correspondence between values written in DSCP fields of IP packets and fragment sizes to be decided is registered. For example, when a DSCP field has a value of "101110", a short frame (for example, 127 octets) is selected as a fragment size. When a DSCP field has a value of "000000", a long frame (for example, 1327 octets) is selected as a fragment size.

The table 9 of FIG. 2 is just one example. The correspondence between values written in DSCP fields and fragment sizes is not necessarily limited to the table 9 shown in FIG. 2. For example, if there are three or more of value types for the value written in each DSCP field, three or more of size types of fragment size may be set so that the size types correspond to the value types, respectively.

FIG. 3 is a view showing a format of a DSCP field 11 defined by RFC2474. As shown, the DSCP field 11 occupies head six bits of a DS (Differentiated Services) field 10, with the remaining two bits for an unused CU (Currently unused) field 12. As the DS field 10, for example, a TOS field of an IPv4 packet or a Traffic Class field of an IPv6 packet is used.

FIG. 4 is a view showing an example of a wireless multi-hop network system using a plurality of communication apparatuses 1 each shown FIG. 1. In FIG. 4, a node N1, a node N2 and a node N3 represent an original sender's communication apparatus 1, a relay communication apparatus 1 and a final recipient's communication apparatus 1, respectively. Each communication apparatus 1 of the nodes N1 to N3 is configured in the same manner as FIG. 1.

When receiving a data transmission instruction from an upper layer, the communication apparatus 1 of the node N1 creates an IP packet 13, thereafter, divides the IP packet 13 into, for example, four fragments f1 to f4 of a fragment size decided by the fragment-size decision part 3, and then transmits the fragments f1 to f4 to the communication apparatus 1 of the node N2. The communication apparatus 1 of the node N2 combines the received fragments to form the IP packet 13, and after confirming the final recipient, divides the IP packet 13 again into, for example, four fragments f5 to f8, and transmits the fragments f5 to f8 to the communication apparatus 1 of the node N3. The communication apparatus 1 of the node N3 combines the received fragments to form the IP packet 13. The formed IP packet 13 is processed by an upper layer of the communication apparatus 1 of the node N3.

As described above, in the first embodiment, a fragment size is decided based on an upper-layer evaluation parameter and a packet is divided into plurality of fragments of the decided fragment size. Therefore, fragmentation for enhancing upper-layer communication quality is possible. Fragmentation for effectively utilizing a network resource is also possible.

In the embodiment described above, the value of a DSCP field of each IP packet is used as the upper-layer evaluation parameter. However, the value to be used as the upper-layer evaluation parameter is not necessarily limited to the value of a DSCP field.

Second Embodiment

In a second embodiment which will be described below, a fragment size is decided also using a lower-layer evaluation parameter.

Figure 5:
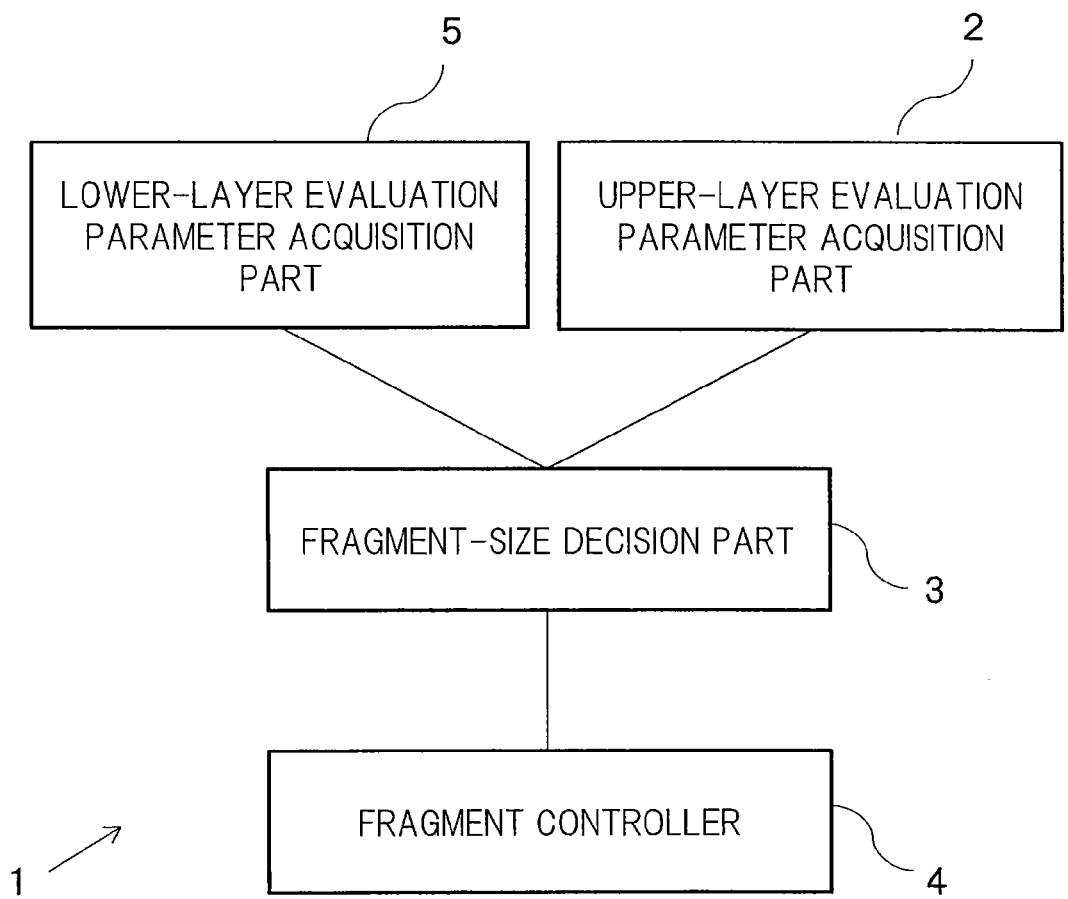
FIG. 5 is a functional block diagram of a communication apparatus 1 according to a second embodiment.

FIG. 5 is a functional block diagram of a communication apparatus 1 according to the second embodiment. In addition to the upper-layer evaluation parameter acquisition part 2, the fragment-size decision part 3 and the fragment controller 4 shown in FIG. 1, the communication apparatus 1 of FIG. 5 is provided with a lower-layer evaluation parameter acquisition part 5.

The lower-layer evaluation parameter acquisition part 5 acquires an evaluation parameter (hereinafter, a lower-layer evaluation parameter) for lower-side layers among a plurality of layers of a network.

The fragment-size decision part 3 decides a fragment size to be used in dividing a packet that includes information of an upper-side layer into fragments, based on an upper-layer evaluation parameter and a lower-layer evaluation parameter. The fragment size to be decided requires to be smaller than the maximum frame size of a data link layer. If it is impossible to acquire flow classification information of an upper layer for a received packet, the fragment-size decision part 3 may set a fragment size to the maximum frame size of a data link layer.

In the same manner as the first embodiment described above, the upper-layer evaluation parameter acquisition part 2 may acquire a value written in a DSCP field of each IP packet as an upper-layer evaluation parameter. Or the upper-layer evaluation parameter acquisition part 2 may acquire at least either an upper layer type or an upper-layer communication profile as an upper-layer evaluation parameter.

The lower-layer evaluation parameter acquisition part 5 acquires, for example, at least either a bit error rate BER or a channel busy rate CBR as a lower-layer evaluation parameter.

FIG. 6 is a table 21 that shows the correspondence among an upper layer type, an upper-layer communication profile and a threshold value of a lower-layer evaluation parameter. Symbols "*" in the table 21 of FIG. 6 indicate entries by which any values are settable. Letters "S", "D" and "P" indicate active entries by which values are actively set. Entries other than these entries are passive entries by which designated fixed values are set. In this specification, an upper-layer protocol corresponding to flow classification information with no active entries is referred to as a passive flow and an upper-layer protocol corresponding to flow classification information with active entries is referred to as an active flow.

As shown in FIG. 6, the upper layer type includes an upper-layer protocol name and flow classification information. The flow classification information includes an original-sender IP address, a destination IP address, a destination IP prefix, a protocol, an original-sender port number, and a destination port number. The protocol in the flow classification information is a protocol of a layer immediately above an IP packet. The protocol in the upper-layer protocol name is a protocol of a layer further above the protocol in the flow classification information.

In FIG. 6, upper-layer protocols RTP and RTCP are active flows and the other are passive flows. An actual value of an active entry to an active flow is acquired from a control protocol such as an upper-layer control protocol. The active flows of the upper-layer protocols RTP and RTCP use SDP (Session Description Protocol) defined by RFC-4566 as an upper-layer protocol. In this case, the upper-layer evaluation parameter acquisition part 2 acquires an upper layer type from the SDP and decides a real-time communication requirement from an upper-layer protocol name included in the acquired upper layer type, and thereafter, makes correspondence between the flow classification information of the acquired upper layer type and the real-time communication requirement.

The upper-layer communication profile in FIG. 6 includes a real-time requirement that indicates whether real time is requested. The value of the real-time requirement is decided, for example, according to a protocol in flow classification information.

For example, a real-time requirement to an arbitrary passive flow that uses TCP or PANA/UDP as a protocol has a value "0", a real-time requirement to IPsec ESP and Psec AH has a value "−1", and a real-time requirement to other passive and active flows has a value "1". The real-time requirement values "1", "0" and "−1" mean real-time is required, real-time is required and it is unclear whether real-time is required or not, respectively.

The threshold value of the lower-layer evaluation parameter in FIG. 6 is decided by the upper-layer evaluation parameter. For example, if a protocol in flow classification information is TCP, the maximum value BER_max of a bit error rate and the maximum value CBR_max of a channel busy rate are set to 0.0004 and 0.7, respectively. if a protocol in flow classification information is PANA/UDP, BER_max and CBR_max are set to 0.00003 and 0.6, respectively.

In more detail, the values of BER_max and CBR_max can be calculated by network simulation, numerical analysis, etc. based on an upper-layer session establishment failure probability and an upper-layer evaluation parameter that includes an upper-layer communication profile. In this case, the upper-layer communication profile may include an upper-layer session establishment delay requirement. The upper-layer session establishment delay requirement may be an allowable average value, an allowable maximum value or an allowable 99% value of an upper-layer session establishment delay time.

As described above, as BER_max, any one of the maximum value, minimum value, average value and cumulatively added value of the bit error rate may be used. Likewise, as CBR_max, any one of the maximum value, minimum value, average value and cumulatively added value of the channel busy rate of each link on a communication path may be used. When the average value is calculated, any one of simple moving average, weighted moving average and exponential moving average may be used.

Moreover, the upper-layer communication profile may include an upper-layer message transmission profile and an upper-layer retransmission profile. The upper-layer message transmission profile is expressed, for example, by "r" indicating whether there is upper-layer message retransmission and a sequence $\{(r\_1, L\_1), (r\_2, L\_2), \ldots, (r\_n, L\_n)\}$ of a pair $(r, L)$ of an octet length L. Here, r_1 and L_1 indicate whether there is retransmission of an i-th upper-layer message and an octet length of the i-th upper-layer message, respectively. The transmission path of an even number upper-layer message is reverse of an odd number upper-layer message. If r_i=1, it is indicated that the i-th upper-layer message is retransmitted by an upper layer. If r_i=0, it is indicated that the i-th upper-layer message is not retransmitted by an upper layer. When an upper layer is PANA, the upper-layer message transmission profile is, for example, $\{(1, L\_1), (1, L\_2), (0, L\_3), (1, L\_4), (0, L\_5), (1, L\_6), (0, L\_7), (1, L\_8), (0, L\_9)\}$. In this case, the first message is a PCI (PANA-Client-Initiation) message, the second, fourth, sixth and eighth messages are PAR (PANA-Auth-Request) messages, and the third, fifth, seventh and ninth messages are PAN (PANA-Auth-Request) messages that correspond to the second, fourth, sixth and eighth messages, respectively. That is, it is indicated that PCI and PAR are retransmitted but PAN is not retransmitted. The upper-layer message retransmission profile may include at least any one of a retransmission algorism ("exponential back-off variable interval", "fixed interval", etc.), a retransmission-interval initial value, a retransmission-interval maximum value, a maximum retransmission count and a maximum retransmission trial period.

Figure 7:
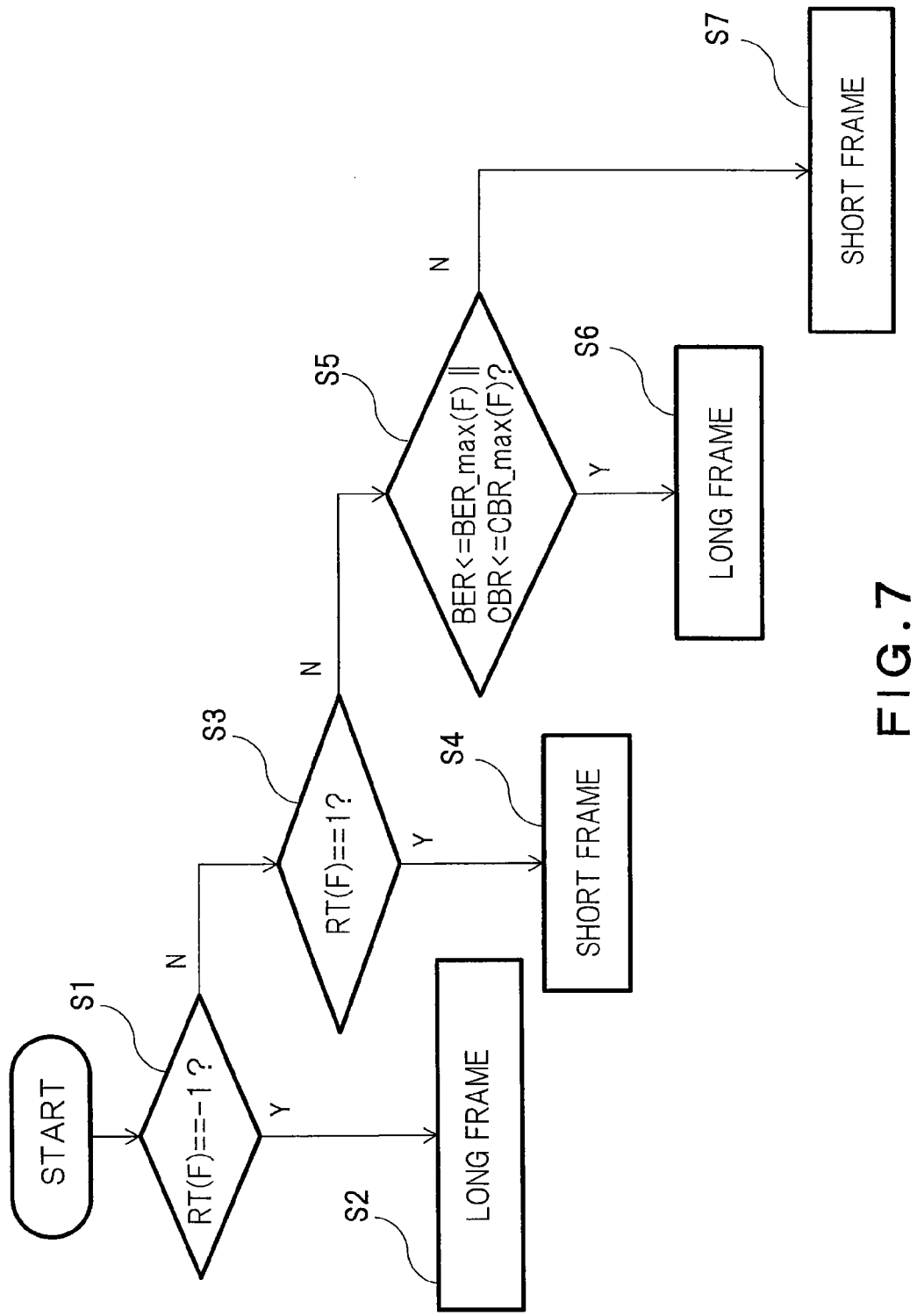
FIG. 7 is a flow chart showing an example of a procedure of a fragment-size decision part 3 in the second embodiment.

FIG. 7 is a flow chart showing an example of a procedure of the fragment-size decision part 3 in the second embodiment. Firstly, it is determined whether a real-time communication requirement RT(F) is "−1" (step S1). If RT(F)=−1, it is determined that it is unclear whether a real-time property is demanded and a fragment size is set to a long frame (step S2). The fragment size may be set to a short frame when it is unclear whether a real-time property is demanded.

If RT(F) is not "−1", it is determined whether RT(F) is "1" (step S3). If RT(F)=1, it is determined that a real-time property is demanded and the fragment size is set to a short frame (step S4).

If RT(F) is neither "−1" nor "1", it is determined whether a bit error rate BER that is a lower-layer evaluation parameter is equal to or lower than BER_max(F) and a channel busy rate CBR that is also a lower-layer evaluation parameter is equal to or lower than CBR_max(F) (step S5). If the determination of step S5 is YES, the fragment size is set to a long frame (step S6). If the determination of step S5 is NO, the fragment size is set to a short frame (step S7).

By using a plurality of communication apparatuses 1 each shown in FIG. 5, a wireless multi-hop network system like FIG. 4 can be configured.

FIG. 6 shows an example in which the value of a real-time requirement to encoded protocols IP ESC and IPsec AH is set to "−1". However, the fragment-size decision part 3 may decide a fragment size based on flow classification information that is information before an upper layer protocol is encoded.

As described above, in the second embodiment, a fragment size is decided under consideration of not only an upper-layer evaluation parameter but also a lower-layer evaluation parameter. Therefore, in addition to effective utilization of a network resource with good upper-layer communication quality, fragmentation that can prevent a bit error and channel busy can be performed.

Third Embodiment

In a third embodiment which will be explained below, the contents of a lower-layer evaluation parameter is different from the second embodiment.

A lower-layer evaluation parameter acquisition part 5 in the third embodiment acquires an average frame transmission count ETX as a lower-layer evaluation parameter. The average frame transmission count ETX is an average transmission count of each fragmented packet.

The upper-layer evaluation parameter acquired by an upper-layer evaluation parameter acquisition part 2 in the third embodiment is the same as the second embodiment.

FIG. 8 is a view showing an example of a table 22 that is looked up when a fragment-size decision part 3 in the third embodiment decides a fragment size. The table 22 of FIG. 8 is different from FIG. 2 concerning the contents of the lower-layer evaluation-parameter threshold value, but the other is the same as FIG. 2.

The threshold value of a lower-layer evaluation parameter of FIG. 8 is the maximum allowable value ETX_max of an average frame transmission count ETX. In the example of FIG. 8, ETX_max is set to 2.6 and 2.0 if the protocol in flow classification information is TCP and PANA/UDP, respectively.

Figure 9:
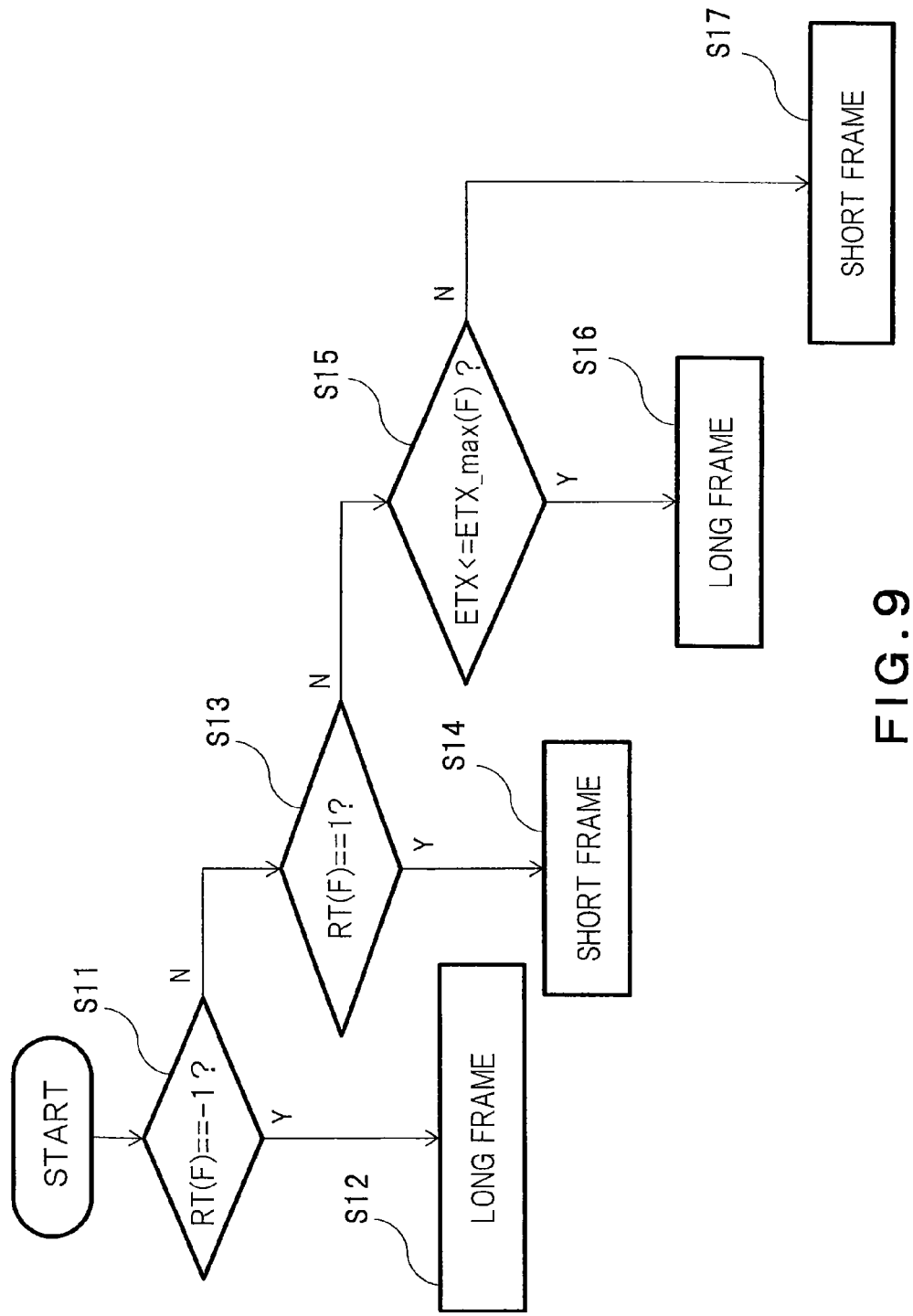
FIG. 9 is a flow chart showing an example of a procedure of a fragment-size decision part 3 in the third embodiment.

FIG. 9 is a flow chart showing an example of a procedure of a fragment-size decision part 3 in the third embodiment. Steps S11 to S14 of FIG. 9 are the same as steps S1 to S4 of FIG. 7. If NO in the determination of step S13, that is, if a real-time requirement RT(F) is neither "−1" nor "1", it is determined whether an average frame transmission count ETX is equal to or smaller than its maximum allowable value ETX_max (step S15). If the average frame transmission count ETX is equal to or smaller than the maximum allowable value ETX_max, a long frame is selected (step S16). If the average frame transmission count ETX is larger than the maximum allowable value ETX_max, a short frame is selected (step S17).

As ETX_max, any one of the maximum value, minimum value and average value of an average frame transmission count of each link on a communication path may be used. When the average value is calculated, any one of simple moving average, weighted moving average and exponential moving average may be used.

By using a plurality of communication apparatuses 1 each composed of FIG. 8, a wireless multi-hop network system like shown in FIG. 4 can be configured.

As described above, in the third embodiment, the lower-layer evaluation parameter is set to an average frame transmission count ETX under consideration of the effects of both of a bit error rate BER and a channel busy rate CBR. Therefore, the process at the fragment-size decision part 3 is more simplified than the second embodiment.

Fourth Embodiment

In a fourth embodiment which will be explained below, the contents of a lower-layer evaluation parameter is different from the first and second embodiments.

A lower-layer evaluation parameter acquisition part 5 in the fourth embodiment acquires a cumulatively added value ETX_path of the average value of a frame transmission count in each link on a communication path, as a lower-layer evaluation parameter. In the wireless multi-hop network system shown in FIG. 4, the communication apparatus 1 that is a relay node combines received fragments to form a packet, and thereafter, divides the packet into fragments again. However, at a relay node, fragments combining and re-fragmentation may not be performed. In this case, it is preferable to use the cumulatively added value ETX_path of the average value of a frame transmission count as the lower-layer evaluation parameter as described in this embodiment rather than the average value of an average frame transmission count as the lower-layer evaluation parameter as described in the third embodiment.

FIG. 10 is a view showing an example of a table 23 that is looked up when a fragment-size decision part 3 in the fourth embodiment decides a fragment size. The table 23 of FIG. 10 is different from FIG. 2 concerning the contents of the lower-layer evaluation parameter threshold value, but the other is the same as FIG. 2.

The threshold value of a lower-layer evaluation parameter of FIG. 10 is the maximum allowable value ETX_path_max of a cumulatively added value ETX_path of the average value of a frame transmission count. The ETX_path_max is an active entry expressed by the product of a hop count H multiplied by an average frame transmission count ETX_max. The value of H can be acquired from a control protocol such as a routing control protocol. When the average value is calculated, any one of simple moving average, weighted moving average and exponential moving average may be used.

As described above, the lower-layer evaluation parameter acquisition part 5 may acquire a lower-layer evaluation parameter from a routing control protocol. For example, when RPL defined by RFC6550 is used as a routing control protocol, the cumulatively added value of the average value of a frame transmission count of each link on a communication path can be acquired from the routing control protocol.

Moreover, the lower-layer evaluation parameter may include a hop count up to a destination node. For example, the lower-layer evaluation parameter may include a plurality of hop-node candidates to be a next hop node. In this case, the fragment-size decision part 3 may decide a fragment size for each of the hop-node candidates to be a next hop node.

Figure 11:
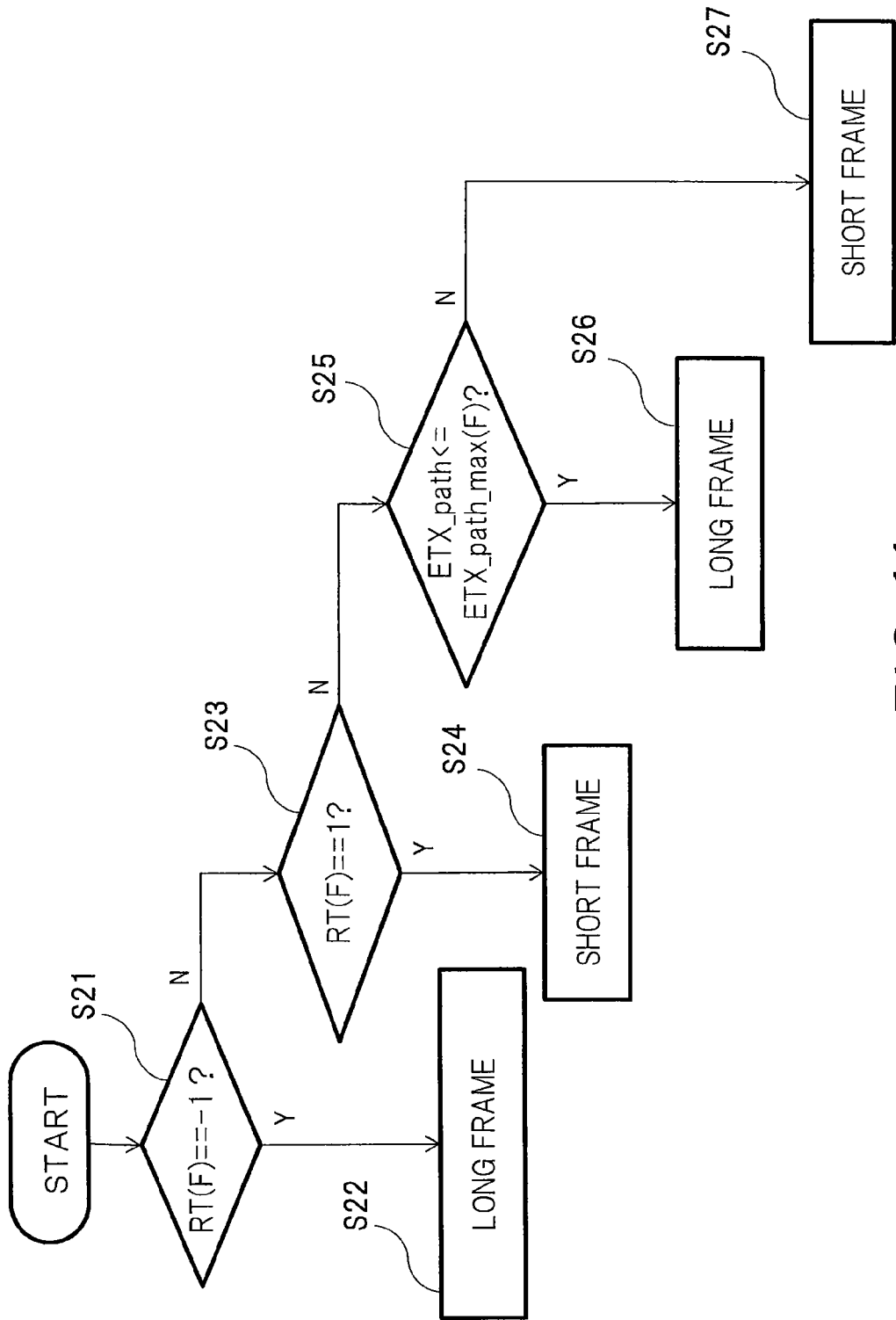
FIG. 11 is a flow chart showing an example of a procedure of a fragment-size decision part 3 in the fourth embodiment.

FIG. 11 is a flow chart showing an example of a procedure of a fragment-size decision part 3 in the fourth embodiment. Steps S21 to S24 of FIG. 11 are the same as steps S1 to S4 of FIG. 7. If NO in the determination of step S23, that is, if a real-time requirement RT(F) is neither "−1" nor "1", it is determined whether a cumulatively added value ETX_path of the average value of a frame transmission count is equal to or smaller than its maximum allowable value ETX_path_max (step S25). If the cumulatively added value ETX_path is equal to or smaller than the maximum allowable value ETX_path_max, a long frame is selected (step S26). If the cumulatively added value ETX_path is larger than the maximum allowable value ETX_path_max, a short frame is selected (step S27).

Figure 12:
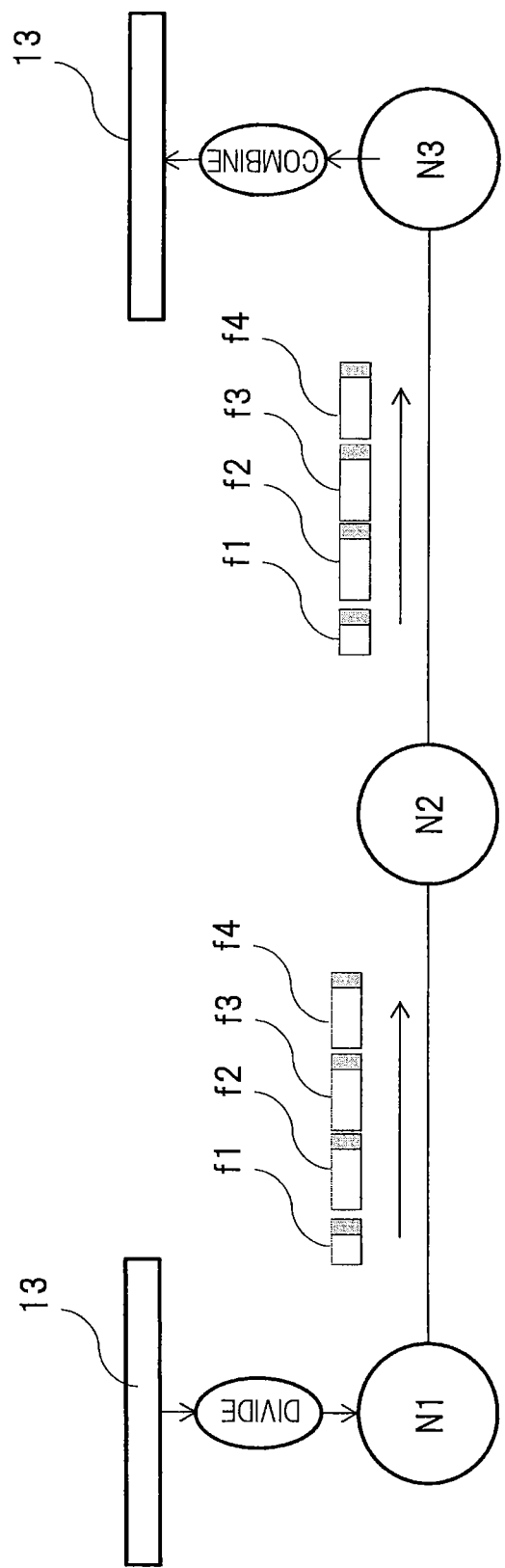
FIG. 12 is a view showing an example of a wireless multi-hop network system using a plurality of communication apparatuses 1 according to the fourth embodiment.

FIG. 12 is a view showing an example of a wireless multi-hop network system using a plurality of communication apparatuses 1 according to the fourth embodiment. FIG. 12 is different from FIG. 4 in that the communication apparatus 1 of the relay node N2 does not perform fragmented-packet combining or packet re-fragmentation. In other words, the relay node N2 performs the process of transmitting a fragmented and received packet to a next destination without combining and re-fragmentation.

As described above, in the fourth embodiment, a cumulatively added value of the average value of a frame transmission count is used as a lower-layer evaluation parameter to decide a fragment size. Therefore, even in the case where a relay node does not perform packet combining and re-fragmentation, the upper-layer communication quality becomes favorable and a network resource can be effectively used.

Fifth Embodiment

In a fifth embodiment which will be explained below, a fragment size is decided by referring further to a content type.

A communication apparatus 1 according to the fifth embodiment is configured in the same manner as, for example, FIG. 5. It is intended that, for example, a DSCP field of an IP packet is used as an upper-layer evaluation parameter.

In more practically, as upper-layer evaluation parameters, flow classification information, a real-time requirement and a content type are used. A DSCP value corresponding to a fragment size decided by a fragment-size decision part 3 is written in a DSCP field. Accordingly, a communication apparatus of a succeeding node can perform fragmentation by referring to the DSCP field.

The upper-layer protocol in this embodiment is, for example, RTP (A Transport Protocol for Real-Time Applications) defined by RFC1889. For a content type, PT (Payload Type) of RTP is referred to. For example, when PT is 14 (corresponding to MPEG1/MPEG2), a P (Picture Type) field of an MPEG Video-specific header defined by RFC2250, that is encoded in the head 4-octet portion of a RTP pay load, is referred to. The P field is information that corresponds to the layer level in layered encoding. A P-field value of 1 indicates one frame as the basic layer.

As described above, when media data encoded by layered encoding such as MPEG2 is transmitted, the layer level in layered encoding may be used as the content type of an upper layer.

A wireless multi-hop network system using a plurality of communication apparatuses 1 according to the present embodiment is configured in the same manner as FIG. 4. At each of nodes on a communication path that include an original-sender node, 6LoWPAN fragmentation is performed.

Like the other embodiments, at the original-sender node, IP fragmentation may be performed to an IP packet before being fragmented by 6LoWPAN fragmentation.

The communication apparatus 1 of the original-sender node has the same internal configuration as FIG. 5. The communication apparatuses 1 of the other nodes have the same internal configuration as FIG. 1. The communication apparatuses 1 of the nodes other than the original-sender node use, for example, the value of an IP packet of a DSCP field, as an upper-layer evaluation parameter. As shown in FIG. 2, a DSCP value is written in a DSCP field. With this DSCP value, whether a long frame or a short frame can be decided.

Figure 13:
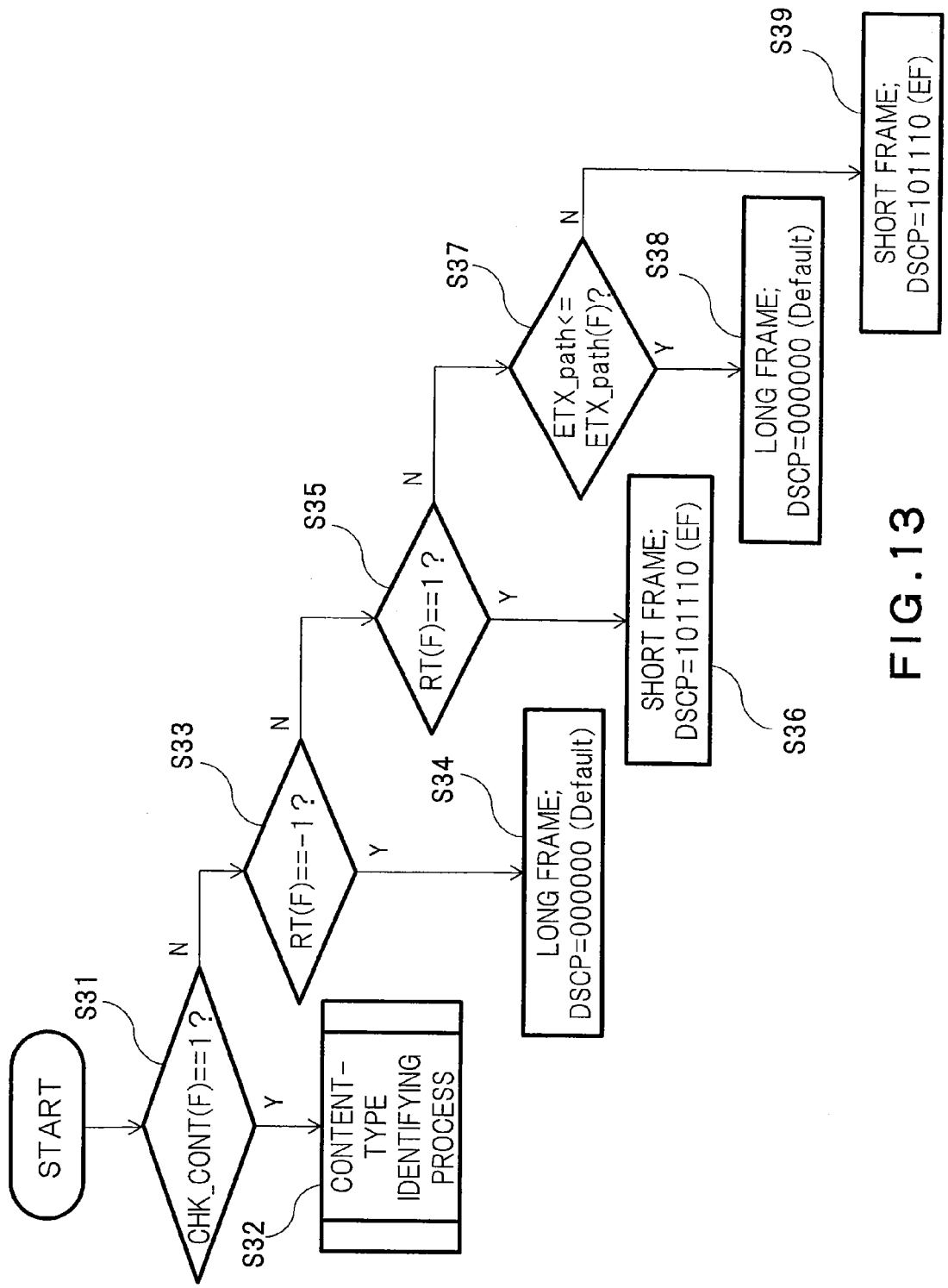
FIG. 13 is a flow chart showing an example of a procedure of a fragment-size decision part 3 in a communication apparatus 1 of an original-sender node.

FIG. 13 is a flow chart showing an example of a procedure of the fragment-size decision part 3 in the communication apparatus 1 of the original-sender node. Firstly, information CHECK_CONT(F) that specifies whether to refer up to the content type of an upper-layer protocol to flow classification information F is confirmed (step S31). If it is 1, a content-type identifying process starts (step S32). If it is 0, a fragment size is decided in the same manner as step S21 and the succeeding steps of FIG. 11 (steps S33 to S39).

Figure 14:
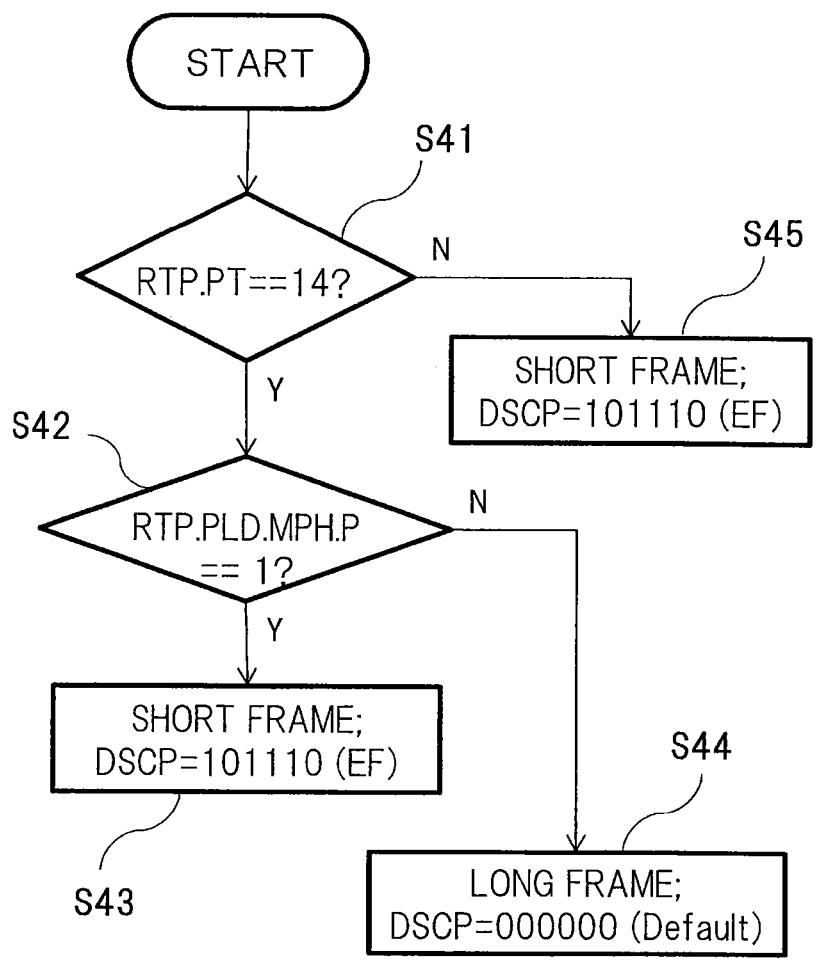
FIG. 14 is a flow chart showing a detailed procedure of a content-type identifying process of step S32 in FIG. 13.

FIG. 14 is a flow chart showing a detailed procedure of the content-type identifying process of step S32 in FIG. 13. Firstly, it is determined whether a PT field (RTP.PT) of an RTP header has a value 14 (step S41). If it is 14, it is then determined whether a P field (RTP.PLD.MPH.P) of an MPEG Video-specific header of an RTP payload has a value 1 (step S42). If it is 1, a fragment size is set to a short frame (step S43). If it is not 1, the fragment size is set to a long frame (step S44). If it is not 14 in step S41, the fragment size is set to a short frame (step S45).

As described above, in the fifth embodiment, a fragment size is decided by referring up to the content type. Therefore, a further network resource can be effectively used. Moreover, the communication apparatuses 1 of nodes other than the original-sender node decide a fragment size by referring to a DSCP field of an IP packet without using a lower-layer evaluation parameter. Therefore, the internal configuration of the communication apparatus 1 can be simplified. Furthermore, even if the original flow classification information is inaccessible due to a reason such that a packet has been encoded, a fragment size can be decided at similar accuracy to the case of accessible original flow classification information.

Figure 15:
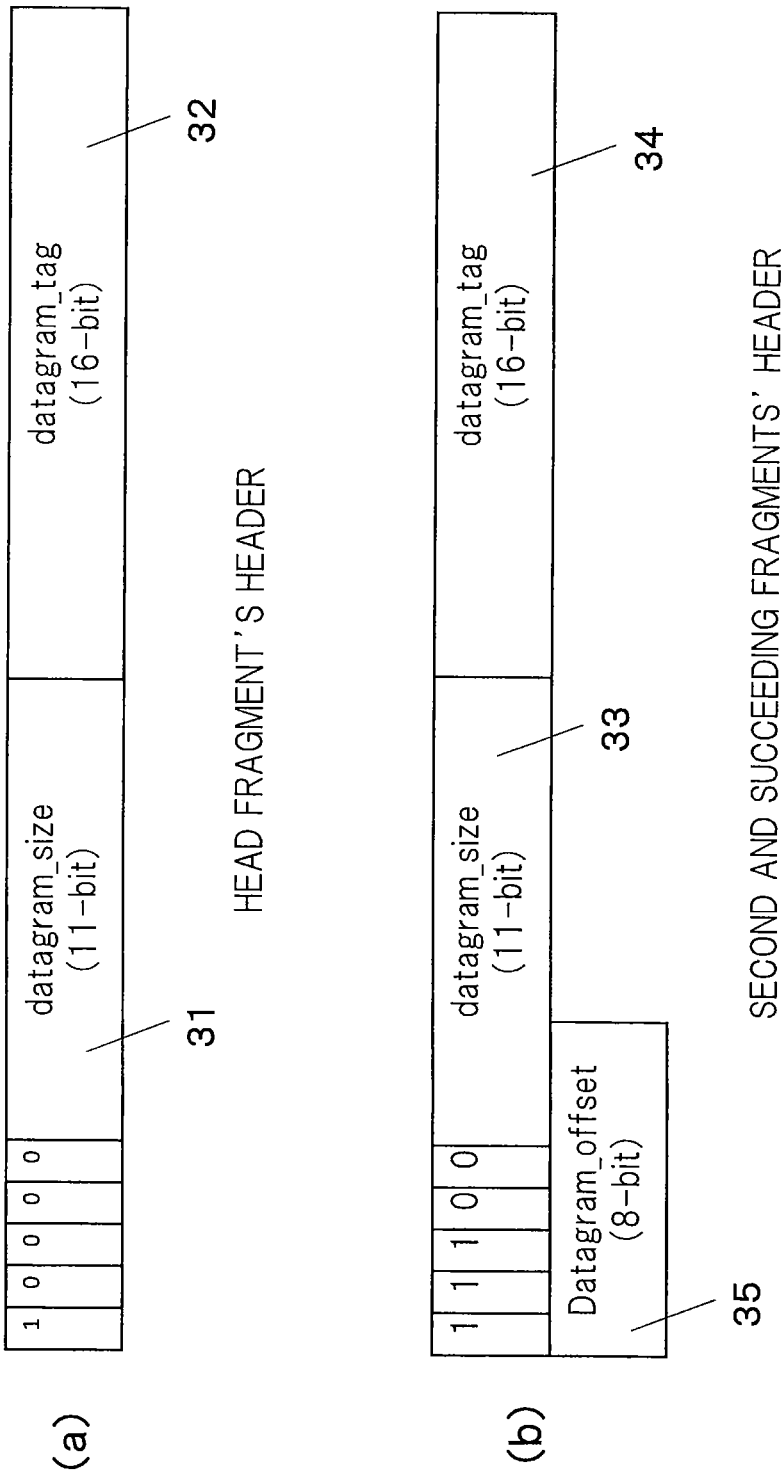
FIGS. 15(a) and 15(b) are views showing data structures of 6LoWPAN fragments.

In the first to fifth embodiments described above, an example of an IP packet and 6LoWPAN fragmentation has been explained. By using FIGS. 15 and 16, the data structure of a 6LoWPAN fragment, an IP packet and an IEEE802.15.4 frame will be explained.

In 6LoWPAN fragments, the head fragment, and the second and succeeding fragments are different from each other. As shown in FIG. 15(a), the head fragment has head 5-bit "10000" followed by an 11-bit datagram_size field 31 that is followed by a 16-bit datagram_tag 32. In contrast, as shown in FIG. 15(b), the second and succeeding fragments have head 5-bit "11100" followed by an 11-bit datagram_size field 33 that is followed by a 16-bit datagram_tag 34 that is followed by an 8-bit datagram_tag 35. The datagram_size field 33 indicates the length of an IP packet before fragmented. The datagram_tag 34 is a tag for identifying an IP packet before fragmentated, with the same value given to all of the fragments of the same IP packet. The datagram_offset 35 represents, per octets, an offset of the head of an IP packet before fragmented.

Figure 16:
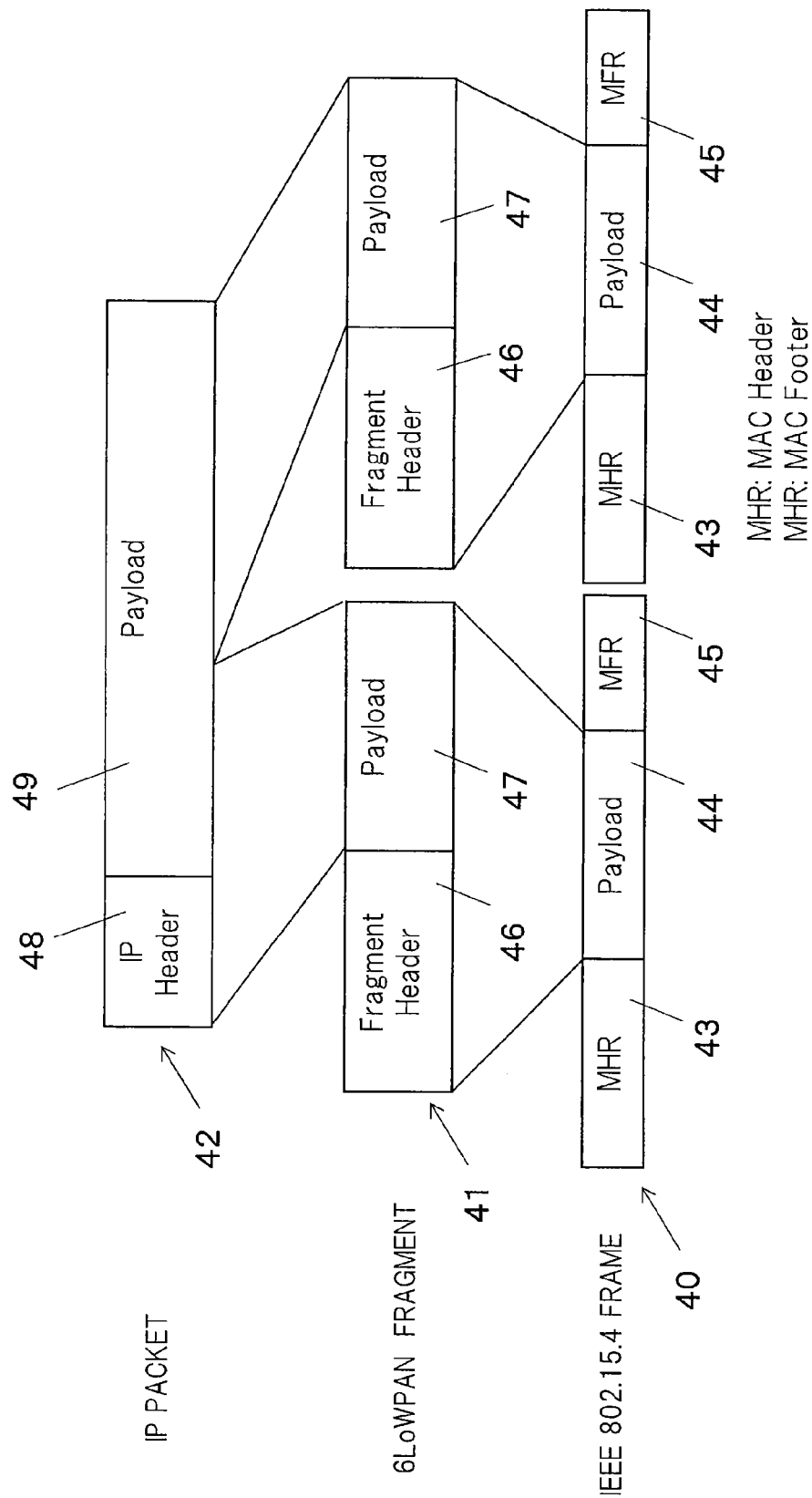
FIG. 16 is a view showing data structures of a 6LoWPAN fragment, an IP packet and an IEEE802.15.4 frame.

FIG. 16 is a view showing formats of a MAC frame 40, a 6LoWPAN fragment 41 and an IP packet 42 in the case of transmitting 6LoWPAN fragments by a MAC layer of IEEE802.15.4. In FIG. 16, the MAC frame 40 includes an MHR (MAC Header) 43, a Payload 44 and an MFR (MAC Footer) 45, with the 6LoWPAN fragment 41 contained in the Payload 44.

The 6LoWPAN fragment 41 includes a Fragment Header 46 and a Payload 47 that contains the IP packet 42. The IP packet includes an IP Header 48 and a Payload 49.

In each embodiment described above, the fragment size is, for example, set to a value related to an 802.15.4 frame size.

Each of the above embodiments is described for the 6LoWPAN fragmentation. However, the present invention is not necessarily limited to the 6LoWPAN fragmentation.

Moreover, FIGS. 7, 9, 11 and 13 show fragmentation procedures. However, it is not necessarily to perform fragmentation in the same manner as these procedures. A fragmentation procedure may change depending on the packet type, upper-layer evaluation parameter and lower-layer evaluation parameter.

The communication apparatus 1 according to each embodiment described above can be realized, for example, with a general-purpose computer as basic hardware. That is, the lower-layer evaluation parameter acquisition part 5, the upper-layer evaluation parameter acquisition part 2, the fragment-size decision part 3, and the fragment controller 4 can be realized by running a program on a processor installed in the above computer. In this case, the communication apparatus 1 may be realized by preinstalling the above program in the computer or by installing the above program in the computer, that is stored in a storage medium such as CD-ROM or is distributed over the Internet. The fragment-size decision part 3 may be realized by being built in the above computer or by using a storage medium such as an external memory or hard disk, or CD-R, CD-RW, DVD-RAM, DVD-R, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication apparatus comprising:
   an upper-layer evaluation parameter acquisition part to acquire an evaluation parameter for an upper-side layer among a plurality of layers included in a network;
   a lower-layer evaluation parameter acquisition part to acquire an evaluation parameter for a layer lower than the upper-side layer among the plurality of layers;
   a fragment-size decision part to decide a fragment size to be used in dividing a packet that includes information of an upper-side layer into fragments, based on the evaluation parameter acquired by the upper-layer evaluation parameter acquisition part and the lower-layer evaluation parameter acquisition part; and
   a fragment controller to divide the packet into a plurality of fragments based on the fragment size,
   wherein the evaluation parameter acquired by the lower-layer evaluation parameter acquisition part includes at least one of a bit error rate, a channel busy rate, an average fragmented-packet transmission count and a cumulatively added value of an average value of a fragmented-packet transmission count.

2. The apparatus of claim 1, wherein the evaluation parameter acquired by the upper-layer evaluation parameter acquisition part includes a value of a DSCP (Differentiated Services Code Point) field included in an IP header of an IP packet.

3. The apparatus of claim 1, wherein the evaluation parameter acquired by the upper-layer evaluation parameter acquisition part includes an upper layer type.

4. The apparatus of claim 3, wherein the upper layer type includes at least one of an upper-layer protocol name, flow classification information and an upper-layer communication profile.

5. The apparatus of claim 1, wherein the lower-layer evaluation parameter acquisition part acquires the evaluation parameter from a routing protocol.

6. The apparatus of claim 1, wherein the evaluation parameter acquired by the lower-layer evaluation parameter acquisition part includes a hop count up to a destination node.

7. The apparatus of claim 1, wherein the evaluation parameter acquired by the lower-layer evaluation parameter acquisition part includes information on a next hop node,
wherein the fragment-size decision part decides the fragment size per hop node based on the information.

8. The apparatus of claim 1, wherein the fragment-size decision part sets the fragment size to a maximum frame size of a link layer when flow classification information of an upper layer of a received packet cannot be acquired.

9. The apparatus of claim 1, wherein the fragment-size decision part writes a DSCP (Differentiated Services Code Point) value corresponding to a decided fragment size to a DSCP field of an IP packet.

10. A non-transitory recording medium for storing a program executed by a computer, the program comprising:
acquiring an evaluation parameter for an upper-side layer among a plurality of layers included in a network;
acquiring an evaluation parameter for a layer lower than the upper-side layer among the plurality of layers;
deciding a fragment size to be used in dividing a packet that includes information of an upper-side layer into fragments, based on the acquired evaluation parameter for the upper-side layer and the lower-side layer; and
dividing the packet into a plurality of fragments based on the fragment size,
wherein the acquired evaluation parameter of the lower-side layer includes at least one of a bit error rate, a channel busy rate, an average fragmented-packet transmission count and a cumulatively added value of an average value of a fragmented-packet transmission count.

11. The medium of claim 10, wherein the acquired evaluation parameter of the upper-side layer includes a value of a DSCP field included in an IP header of an IP packet.

12. The medium of claim 10, wherein the acquired evaluation parameter of the upper-side layer includes an upper layer type.

13. The medium of claim 12, wherein the upper layer type includes at least one of an upper-layer protocol name, flow classification information and an upper-layer communication profile.

14. The medium of claim 10, wherein the lower-layer evaluation parameter of the lower-side layer is acquired from a routing protocol.

15. The medium of claim 10, wherein the acquired evaluation parameter of the lower-side layer includes a hop count up to a destination node.

16. The medium of claim 10, wherein the acquired evaluation parameter of the lower-side layer includes information on a next hop node,
wherein the fragment size is decided by each hop node based on the information.

\* \* \* \* \*